July 6, 1965   J. P. LINDSEY ETAL   3,193,797
DETECTION OF LOW SIGNAL-TO-NOISE RATIO SEISMIC SIGNALS
Filed Nov. 27, 1961   6 Sheets-Sheet 1

*INVENTORS*
J. P. LINDSEY
S. E. ELLIOT
R. C. LORING

BY

*Young & Quigg*
ATTORNEYS

INVENTORS
J. P. LINDSEY
S. E. ELLIOT
R. C. LORING

BY

*Young & Quigg*
ATTORNEYS

July 6, 1965  J. P. LINDSEY ETAL  3,193,797
DETECTION OF LOW SIGNAL-TO-NOISE RATIO SEISMIC SIGNALS
Filed Nov. 27, 1961  6 Sheets-Sheet 4
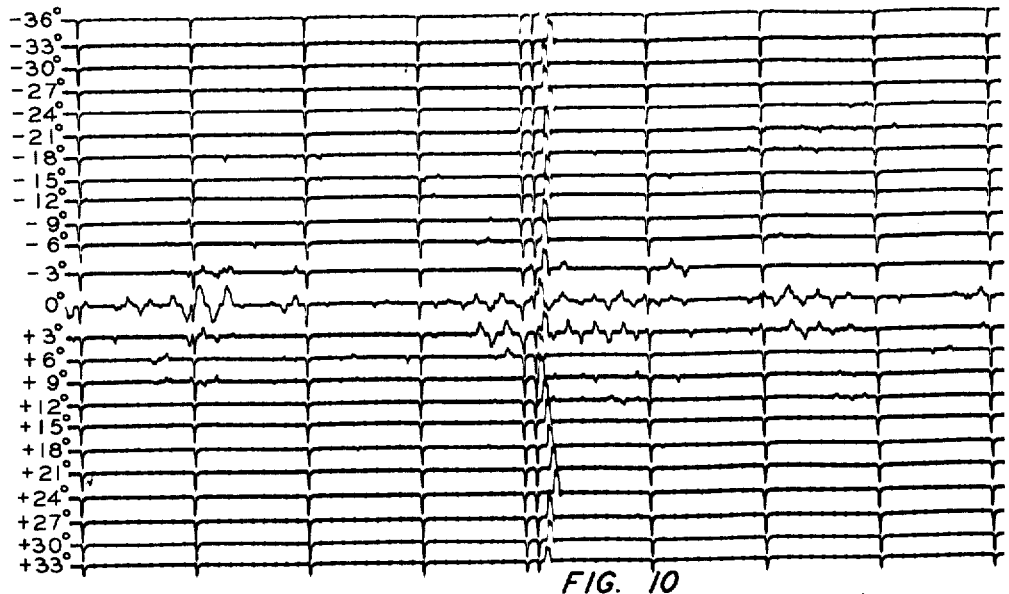
FIG. 10
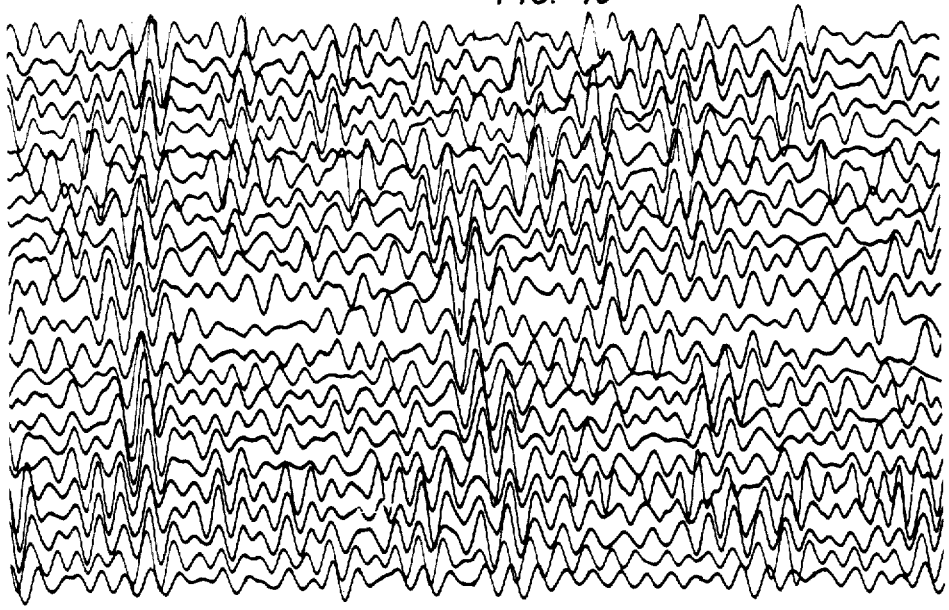
TIME ⟶  FIG. 9
INVENTORS
J. P. LINDSEY
S. E. ELLIOT
R. C. LORING
BY *Young + Quigg*
ATTORNEYS

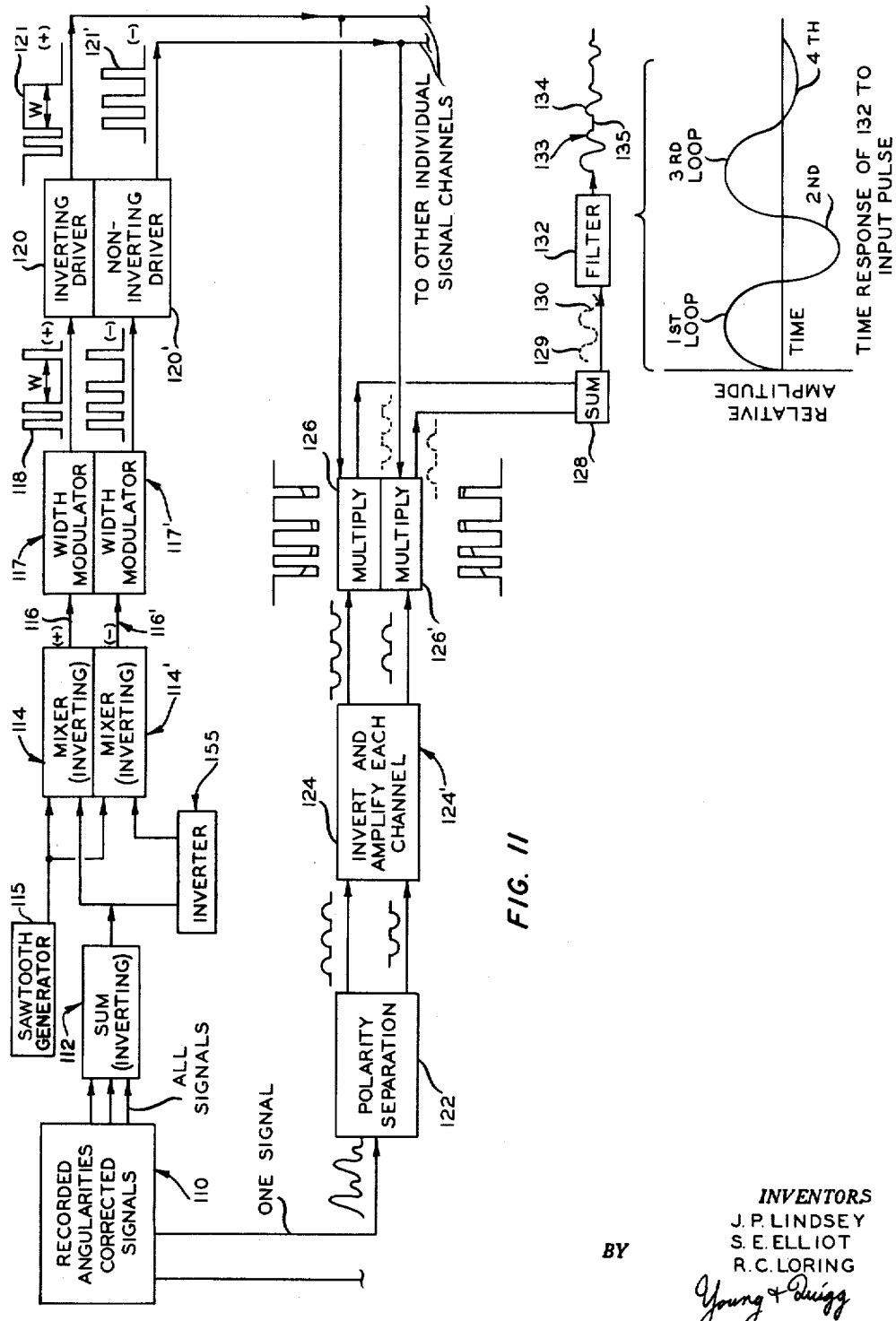

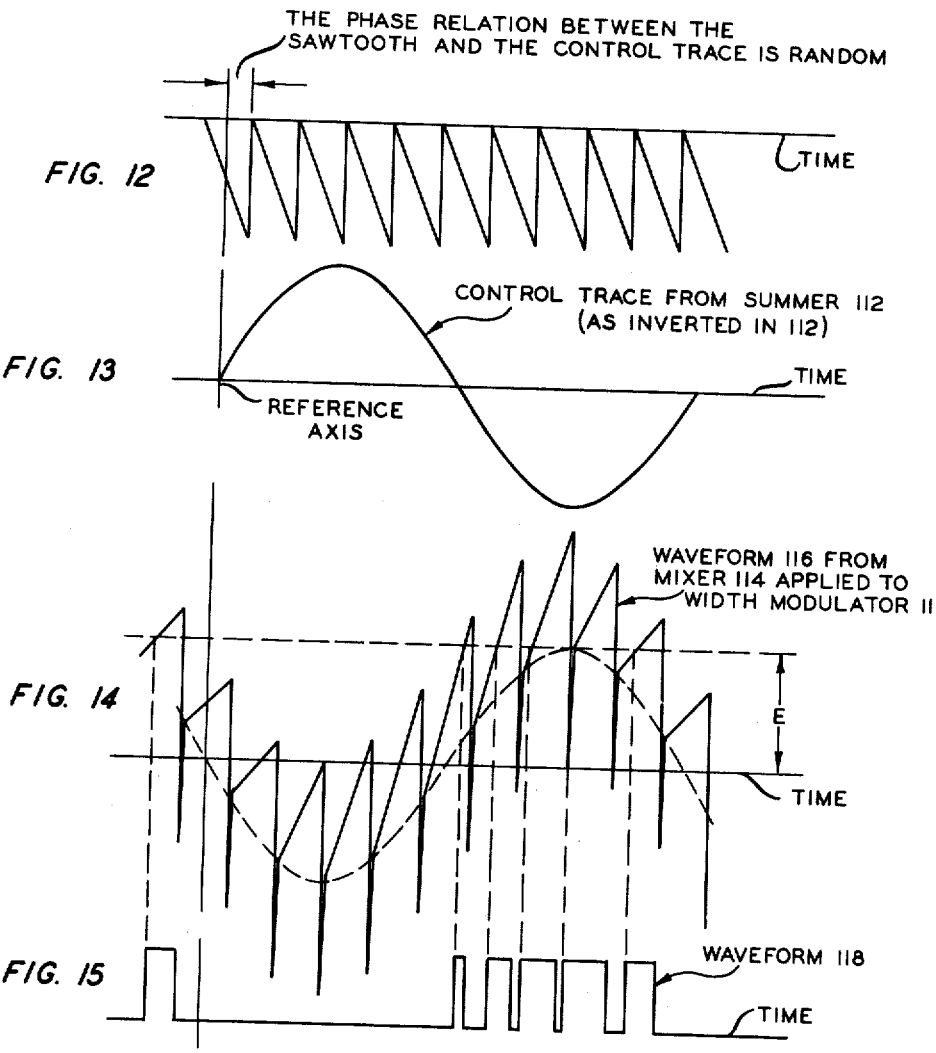

United States Patent Office 3,193,797
Patented July 6, 1965

3,193,797
DETECTION OF LOW SIGNAL-TO-NOISE RATIO
SEISMIC SIGNALS
Joe P. Lindsey, Sheldon E. Elliott, and Ralph C. Loring, all of Bartlesville, Okla., assignors to Phillips Petroleum Company, a corporation of Delaware
Filed Nov. 27, 1961, Ser. No. 155,113
12 Claims. (Cl. 340—15.5)

This invention relates to a method and apparatus for utilization in the identification of information in a plurality of signals. In one aspect the invention relates to reflection seismology, whereby seismograph records are produced and geophysical data interpreted therefrom. In another aspect the invention relates to the identification of information contained in low signal-to-noise ratio signals. In yet another aspect the invention relates to method and apparatus for improving the signal-to-noise ratio of seismic signals.

The detection of systematic reflection events on seismograph records by visual means is often extremely difficult, if not impossible, when the energy in the systematic reflection events is of the same order of or less than that in the unsystematic events appearing on the same recordings. As a practical manner visual identification of common reflections in a plurality of records generally cannot be made unless the signal-to-noise ratio is greater than approximately 1.5. Unfortunately, records of this quality cannot always be obtained in many areas.

Many methods have been proposed and developed to improve the seismic record to enable the operator to detect reflection arrivals. These methods fall into the three broad categories of the application of some form of filtering, the addition of several traces containing systematic events, and the use of special methods of displaying the seismic data.

Conventional filtering has been pretty well exploited in years past. The need for a high pass, low pass, or band pass filter is usually obvious from the record appearance if some semblance of signal is present. However, conventional filtering has severe limitations when special problems exist such as extremely low signal-to-noise ratios, periodic interferences caused by surface layer waveguide phenomena, ghost reflections, etc., or when the deeper reflection arrivals are severely scattered by an inhomogeneous surface layer. Solution of these problems requires that the concept of filtering be considerably broadened to include any black box that will improve the signal-to-noise ratio and this is seldom just a high pass or low pass filter.

Three specific problems just mentioned—ghosts, waveguide phenomena, and scattering—can be handled by non-conventional filters of the proper design. In the case of scattering, it can be shown that given enough information about the signal and noise, a theoretically "optimum" filter can be designed to bring out a specific signal wavelet and reject a specific noise with great success. To apply this technique to the seismograph problem requires more knowledge than is available, particularly about the noise on each trace. In a pratcial sense, only statistical information is known concerning the noise, and the best estimate of the signal is that obtained from the sum of a certain number of traces. With these limitations, the effectiveness of a "static optimum" filter is considerably reduced.

From the use of the "static optimum" filter it has been learned that an optimum filter must vary its tuning to match each reflection wave-shape on the record, thus requiring a dynamic filter characteristic, and that the statistical properties of the noise must be exploited to eliminate as much of the noise as possible without risk of losing the signal.

The attempt to fulfill these requirements has resulted in coherence multiplication, a process that can be viewed as a continuously optimum filtering of the seismic record. This process requires summing of all the traces and multiplying each trace by this sum. The multiplication is carried out only for those intervals of time when the sum trace and the individual trace are of the same polarity. The process yields a record with the same number of traces as before but with a higher signal-to-noise ratio. On the average, the improvement in signal quality of the seismograph is proportional to the square root of the number of traces in the composite.

However, the achievement of this improvement is critically dependent upon the time alignment of the signals; for only when the signal component is aligned is the trace a measure of the quantity desired. This time alignment consideration cannot be overlooked in any mixing process.

The times of arrival of the elastic waves from the shot point to the different seismometers vary with the horizontal or surface distance between the shot point and seismometers. This variation or difference in time across the seismogram is referred to as normal moveout (sometimes as angularity of path) and is a dynamic error which tends to obscure alignments of corresponding signal portions along traces. The normal moveout time varies non-linearly in magnitude during the recording of these seismic signals. The magntiude is largest right after the detonation of the shot, when the differences in distances of the elastic wave travel paths are largest. The magnitude decreases as the differences in travel paths decrease for successively deeper reflecting horizons. The exact manner in which the normal moveout time varies as a function of time after the intial seismic disturbances will, of course, depend on the spacing of the different seismometers and the particular velocity function of the surveyed area.

A second time alignment correction which must be made is due to topographic effects such as variations in the elevation of the shot point and seismometers and the existence of a weathered layer at the earth's surface. These effects introduce constant static errors in the time alignment of seismic events on the seismogram traces.

A number of procedures have been purposed or used in the past for correcting time alignment errors due to normal moveout, elevational, and weathered layer effects. While some of these prior art procedures have worked satisfactorily in some areas, others are not practical because they decrease the signal-to-noise ratios, or they require a number of very time-consuming corrective trace reproductions, while others are not able to cope with the non-linearity of the normal moveout. In addition the prior art procedures have not been able to effectively counteract variations in dip, which is one of the most sensitive errors in time alignment.

However, the requirement of accurate time alignment of low signal-to-noise ratio seismic signals for use in the coherence multiplication process again leads to the difficulties of searching the record for reflection events where the events are not visually evident.

In accordance with one aspect of this invention there is provided a process and apparatus for effecting the proper time alignment of seismic signals even in the presence of substantial amounts of noise wherein the seismic signals are time aligned at various dip angles through the utilization of an electromechanical analog of the time triangle, the time aligned signals for each dip angle are summed to form composite signals, the individual time aligned signals are compared with the respective composite signal to form output signals whenever the individual signals are in phase with the composite signal, the output signals are summed to obtain correlation signals representative of the degree of correlation between the individual signals and the composite signal, and the correlation signals are compared to determine the appropriate dip angle.

In accordance with another aspect of this invention there is provided a process and apparatus for improving the reflection seismology technique by increasing the readability of low signal-to-noise ratio seismic signals by effecting the proper time alignment of the low signal-to-noise ratio signals through the process of time aligning the signals at various dip angles by means of an electromechanical analog of the time triangle, summing the time aligned signals for each dip angle to form composite signals, comparing the individual time aligned signals with the respective composite signal to form output signals, summing the output signals to obtain correlation signals representative of the degree of correlation between the individual signals and the composite signal, and comparing the correlation signals to determine the appropriate dip angle, and then increasing the signal-to-noise ratio of the individual seismic traces which have been time aligned with the proper dip angle by summing all of such traces and multiplying each trace by the sum during the intervals of time when the sum and the individual trace are of the same polarity.

Accordingly, it is an object of the invention to provide an improved process and apparatus for detecting actual seismic signals in the presence of noise. Another object of the invention is to improve the reflection seismology technique by increasing the readability of seismographic records. Another object of the invention is to correct seismographic records by an improved technique which is rapid, accurate, and relatively simple. Another object of the invention is to provide improved method and apparatus for correcting the time alignment of seismic records. Another object of the invention is to provide proper time alignment of seismic signals by considering the effects of various dip angles.

Other aspects, objects and advantages of the invention will be apparent from a study of the disclosure, the drawings and the appended claims.

In the drawings FIGURE 1 is a block diagram of the process in accordance with the invention;

Figure 4:
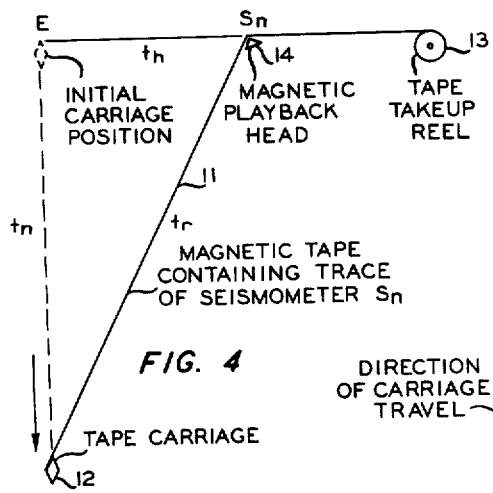
Figure 5:
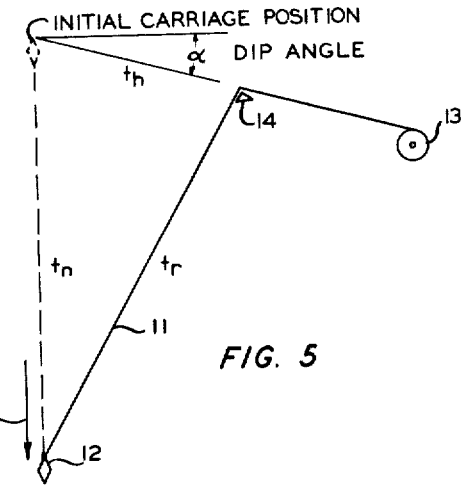
Figure 6:
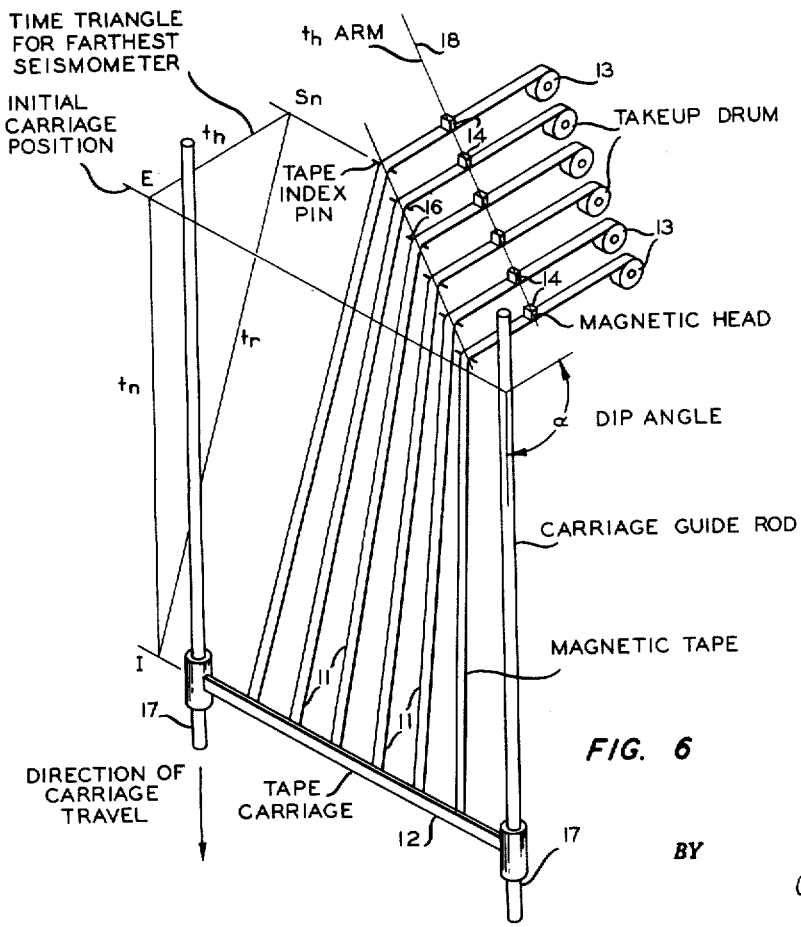
Figures 7, 8:
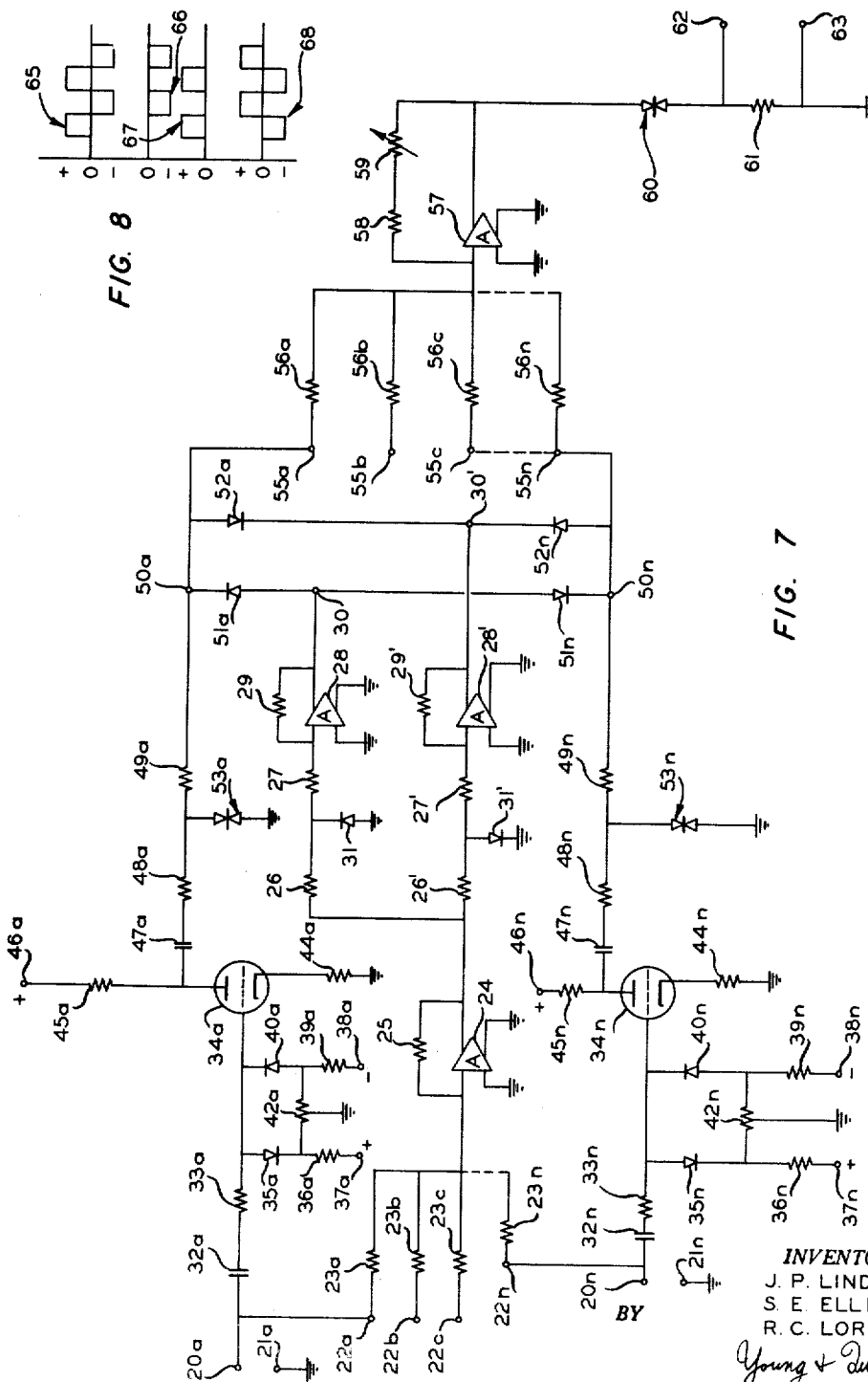

FIGURES 4 and 5 schematically illustrate mechanical analogs of the time triangle;

FIGURE 6 is a schematic view of a multi-channel mechanical analog corrector;

FIGURE 7 is a schematic circuit drawing of one embodiment of the discrimination apparatus;

FIGURE 8 is a schematic representation of the operating features of FIGURE 7;

FIGURE 9 is a representation of seismic signals to be processed;

FIGURE 10 is representation of signals obtained by the discrimination procedure in accordance with the invention;

FIGURE 11 is a schematic representation of the apparatus for the coherence multiplication process; and FIGURES 12, 13, 14 and 15 show the approximate wave forms produced in the apparatus of FIGURE 11.

Figure 1:
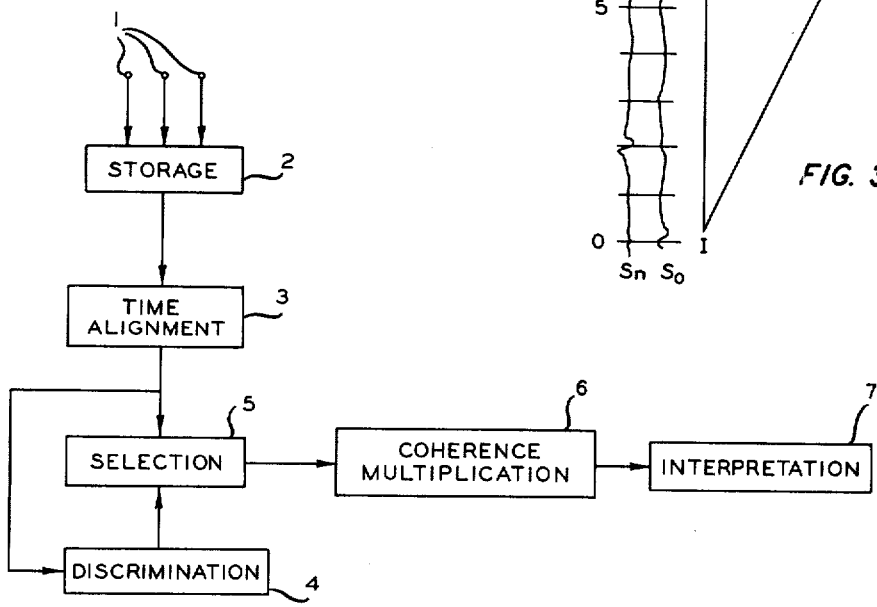

Referring now to broad view of the overall process as shown in FIGURE 1, the outputs from a plurality, commonly 24, of seismic detectors 1 are fed into storage zone 2, which can be a magnetic tape storage device. When it is desired to process the seismic signals, they are removed from storage zone 2 and introduced into time alignment zone 3 wherein the signals are time aligned at various dip angles. The time aligned signals corresponding to each dip angle are passed to discrimination zone 4 to produce a coherence signal for each dip angle. The coherence signals are compared to select the proper dip angle in selection zone 5. The time aligned seismic signals corresponding to the proper dip angle are then passed to coherence multiplication zone 6 wherein the signal-to-noise ratio is improved. The improved signals are then transmitted to interpretation zone 7 for interpretation of the seismic record.

Figure 2:
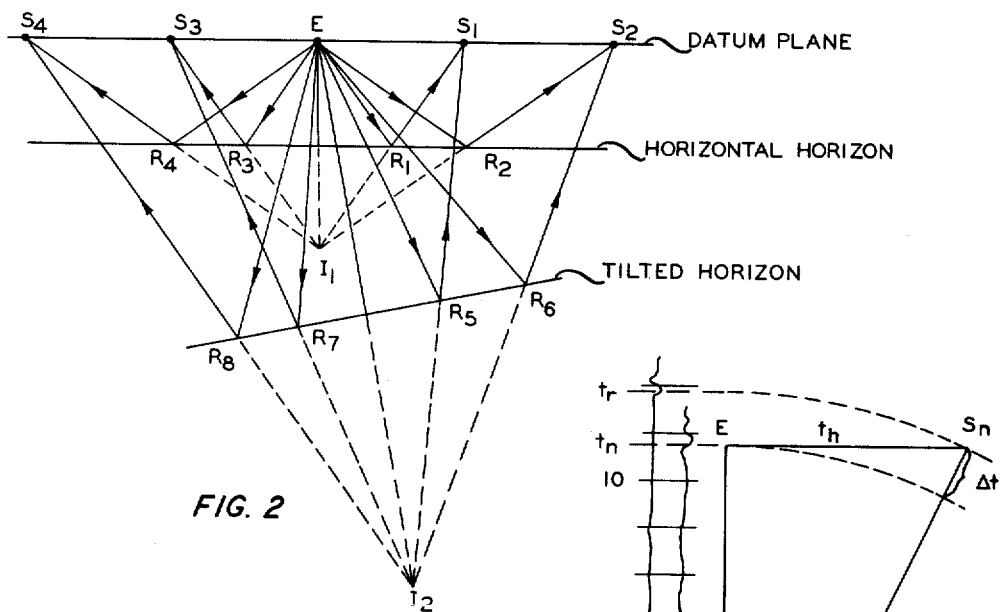
FIGURE 2 is a schematic view of terrain in cross section showing the path geometry of elastic waves as they travel from shot point and are reflected back to seismometers.

The basis for the reflection seismology technique is shown in the space diagram of FIGURE 2. For purpose of brevity, let it be assumed that the datum plane coincides with the surface of the earth. The ray paths generated at shot point E are reflected from subsurface horizons. Two such subsurface horizons are shown in FIGURE 2, one of which is horizontal and the other at an angle or tilted with respect to the earth's surface. An array of seismometers, such as $S_1$, $S_2$, $S_3$, and $S_4$, at the earth's surface and spaced in a predetermined manner from shot point E, detect the arrival of the reflected waves and convert the same into electrical signals which are amplified and recorded on seismograms. The reflected sound waves appear to come from points $I_1$ and $I_2$, known as image points. Each image point lies as far below the particular reflecting horizon as the shotpoint E is above the horizon and is located along a line normal to the reflecting horizon and intersecting the shotpoint. Any ray path $ER_nS_n$, where $S_n$ is the position of any seismometer and $R_n$ any point of reflection, is equivalent to path $I_nR_nS_n$, where $I_n$ is an image point for the horizon in which $R_n$ lies. For example, ray path $ER_1S_1$ is equivalent to path $I_1R_1S_1$, and ray path $ER_3S_4$ is equivalent to path $I_2R_3S_4$. In the case of the horizontal horizon, it is evident that $ER_2S_2$ (or $I_1R_2S_2$) is greater than $ER_1S_1$ (or $I_1R_1S_1$) so that when reflected wave front from the horizontal horizon reaches seismometer $S_1$ the wave front will be short of seismometer $S_2$. In the case of the tilted or dipping horizon, it is evident that $ER_8S_4$ (or $I_2R_8S_4$) is greater than $ER_6S_2$ (or $I_2R_6S_2$) so that when reflected wave front from the tilted horizon reaches seismometer $S_2$ on one side of the shotpoint E, the wave front is still short of the corresponding seismometer $S_4$ on the other side of the shot point. The difference in reflection times is called normal moveout, and it increases both with the degree of tilt or dip and the distance between the end seismometers of the seismometer array or spread.

Figure 3:
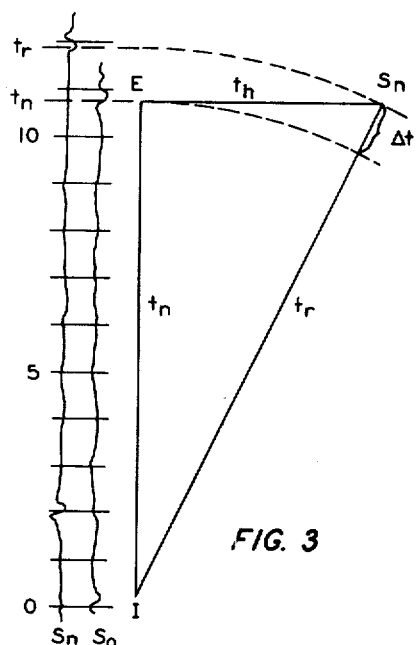
FIGURE 3 is a view showing the pictorial relationship between the traces of a seismogram and the time triangle analog.

The space diagram of FIGURE 2 can be converted into an analog diagram of time, as shown in FIGURE 3. Since the dimensions of the space of FIGURE 2 are distance, division of each of the triangle legs by a velocity parameter converts the triangle dimensions to time. The average velocity $v$ over the ray path is used for the velocity parameter. This conversion to time units produces the time triangle of FIGURE 3 with sides $t_h$, $t_r$, and $t_n$, where $t_h$ is the horizontal time from shot point E to seismometer station $S_n$, $t_r$ is the time from shotpoint E to reflector to seismometer $S_n$ (or from image I to seismometer $S_n$), and $t_n$ is the normal time from shotpoint E to reflector and back to shotpoint.

FIGURE 3 also shows the pictorial relationship between the time of arrival and the traces of a seismogram recorded by a seismometer $S_o$ at a shotpoint E and seismometer $S_n$ located at a known distance from the shotpoint. The difference in arrival times of a seismic event at a seismometer $S_o$ and at seismometer $S_n$ is equal to $\Delta t$, the extra time required for the wave to travel from shotpoint E to reflector to seismometer $S_n$. This extra time is the normal moveout time correction necessary to convert reflection time $t_r$ to normal time $t_n$.

There is an important difference in the dynamic time dependent properties of the space triangle of FIGURE 2 and the time triangle of FIGURE 3. In the space triangle of FIGURE 2, the leg $ES_n$ (shotpoint to seismometer distance) does not vary with time, however, the leg $SI_n$ (shotpoint to image distance) and $I_nS_n$ (image to seismometer distance) both increase in length from the shot instant in a manner determined by the change in average velocity $v$. This increase is uniform with time only if the average velocity is constant. The legs of the time triangle of FIGURE 3 behave somewhat differently. Since average velocity is a determining factor in the length of each leg of the time triangle, all three legs change with record time. The leg $t_h$ usually decreases with record time since the special dimension $ES_n$ is constant and $v$ usually increases. The leg $t_n$ represents elapsed time from the shot instant and increases uniformly. The leg $t_r$ must increase in such a way as to maintain the time triangle closed.

In accordance with the invention, the normal moveout is corrected by the electromechanical analog of the time triangle of FIGURE 3. Such an analog is shown schematically in FIGURE 4. A magnetic tape 11 containing the trace of one seismometer $S_n$ is attached at its initial time end to a tape carriage 12 which is adapted to move at a constant speed in one direction. The other end of the tape 11 is attached to a tape takeup drum 13. Since the tape 11 has a dimension in time units, it can represent the leg $t_r$ of the time triangle. As the tape carriage 12 starts at the indicated initial position and travels uniformly downward, the tape will move across the magnetic playback head 14 allowing the seismic date to be reproduced. The resulting non-uniform tape velocity across the playback head 14 will cause the time of playout of reflection events to be equivalent to normal time $t_n$ rather than reflection time $t_r$ since the location of the playback head 14 and tape 11 are such that reproduced events are advanced by an amount equal to $\Delta t$. Consequently, the normal moveout time correction $\Delta t$ is accomplished directly in playback operation.

Since not all reflection events require the same value of $t_h$, this side of the time triangle must vary in length as the $t_n$ side increases uniformly. The quantity $t_h$ must be maintained proportional to the inverse of average velocity $v$, the constant of proportionality being the shotpoint-to-seismometer distance. The average velocity as a function of normal time must be known or assumed. In most situations the average velocity increases with the record time and the parameter $t_h$ decreases with the increase in normal time $t_n$.

When the reflecting horizon is tilted or dipped, an appropriate change in the time triangle must be made to maintain the mechanical analog. This is accomplished by changing the angle between the $t_h$ and $t_n$ legs of the triangle from 90°. The amount of change is equal to the dip angle $\alpha$. FIGURE 5 illustrates the mechanical analog configuration required for a dip angle $\alpha$.

The analogs discussed to this point have been limited to a single recorded seismic trace. A multi-channel analog with the same accuracy of the single channel analog can be accomplished by instrumenting a multiplicity of mechanical analogs using a common $t_n$ dimension and a multiplicity of $t_h$ dimensions. Since the same average velocity function holds approximately for every trace, the $t_h$ function associated with the farthest seismometer station can be scaled downward for each of the other seismometer stations thereby simplifying the problem of generating the $t_h$ motions required for the multiplicity of time triangles. FIGURE 6 illustrates a six channel time corrector developed as an extension of the single channel corrector of FIGURE 4. Six tapes 11 are attached to a common carriage 12 which is adapted to move along guide rods 17. In FIGURE 6, the corners of the six time triangles represented by the tape index pins 16 are the only corners that are not common. However, these corners are related positionally in the same way that the seismometers stations are related. So, if the index pins 16 are coupled in such a way that movement of the pin for the farthest seismometer station also move the other pins in proportion, all the $t_h$ dimensions of each time triangle are maintained in the proper proportion, and thus all of the six time triangles are generated simultaneously with a downward motion of the tape carriage 12.

There are two basic phases of operation of the multichannel device such as schematically illustrated in FIGURE 6. First, the seismic field data displayed are reproduced in such a manner that each trace of the seismogram is transcribed onto an individual magnetic tape of the analog corrector of this invention. Then, the data on the individual magnetic tapes are played off in such a way that the required time corrections are accomplished. To transcribe the field data onto the individual magnetic tapes of the analog device, all of the index pins 16 (which are attached to magnetic heads 14) are positioned at the initial carriage position. This means that the $t_h$ arm 18 is coupled indirectly to the index pins 16 is positioned so that the $t_h$ dimension is zero. In this condition, the tape carriage is started and moves uniformly downward as each channel of seismic data is recorded on its respective tape. No change in the time alignment of reflection events is produced by the recording of the tapes in this phase.

To play back the data thus recorded on the individual magnetic tapes, the tape carriage 12 is returned to its initial starting position and the $t_h$ arm 18 is swung out to a position corresponding to the $t_h$ value desired at time zero. As the tape carriage 12 is started and moved uniformly downward, the $t_h$ arm 18 is moved in such a way that the proper value of $t_h$ is maintained at all times for all channels. When the playout made in this phase is examined, all reflection events will be time-aligned if the proper $t_h$ occurred at the reflection normal time $t_n$. It is also necessary that the plane containing the $t_h$ dimensions be set at the correct angle. If the reflections are from a subsurface horizon that has zero dip, the $t_h$ plane must be at exactly 90° with respect to the plane of travel of the tape carriage. For other than zero dip angle of the reflecting bed, the $t_h$ plane must be accordingly tilted and then the data played out to achieve the time alignment of the reflection events.

The details of a preferred embodiment of the tape analog corrector are disclosed in copending application Serial No. 123,231, filed July 11, 1961, by R. G. Piety and R. A. Doubt, which is assigned to the assignee of the present application and the description of which is incorporated herein by reference.

Referring now to FIGURE 7, the first of a plurality of signals to be studied for time alignment with proper dip angle is applied between input terminals 20a and 21a, the latter being grounded. Terminal 20a is connected to the first input terminal 22a of a summing network. Terminal 22a is connected by means of an input resistor 23a to the first input terminal of a summing amplifier 24. Amplifier 24, which can be a conventional high gain operational amplifier, is provided with a feedback resistor 25. Amplifier 24 has a suitable number of stages of amplification such that the output signal is in phase with the input signal. This output signal is applied through resistors 26 and 27 to the input of a second amplifier 28. Amplifier 28 is provided with a feedback resistor 29. Amplifier 28 is also provided with a suitable number of stages such that the output signal at terminal 30 is 180° out of phase with the input signal to amplifier 28. A rectifier 31 is connected between ground and the junction between resistors 26 and 27. Rectifier 31 serves to remove the negative half cycles of the input signal applied to amplifier 28. Thus, the signal at terminal 30 comprises a series of negative pulses.

The output signal of amplifier 24 is also transmitted through a second network similar to the one previously described and wherein corresponding elements are designated by like primed reference numerals. The only difference between these two circuits is the polarity of rectifier 31', which results in a series of positive pulses appearing at output terminal 30'.

Input terminal 20a is also connected through a capacitor 32a and a resistor 33a to the control grid of a triode 34a. The control grid of triode 34a is connected through a rectifier 35a and a resistor 36a to a terminal 37a that is maintained at a positive potential. A terminal 38a, which is maintained at a negative potential, is connected through a resistor 39a and a rectifier 40a to the control grid of triode 34a. The first end terminal of a potentiometer 42a is connected to the junction between rectifier 35a and resistor 36a, and the second end terminal of potentiometer 42a is connected to the junction between resistor 39a and rectifier 40a. The contactor of potentiometer 42a is connected to ground. Potentiometer 42a and resistors 36a and 39a thus form a voltage dividing network such that positive and negative bias potentials are applied to rectifier 35a and 40a, respectively. These rectifiers thereby provide a bipolar clipper such that signals having substantially a square wave shape are applied to triode 34a from input terminals 20a.

The cathode of triode 34a is connected to ground through a resistor 44a. The anode of triode 34a is connected through a resistor 45a to a terminal 46a which is maintained at a positive potential. The anode of triode 34a is also connected through a capacitor 47a, a resistor 48a and a resistor 49a to a terminal 50a. A pair of diodes 53a, connected in back-to-back relationship, is connected between ground and the junction between resistors 48a and 49a. These rectifiers function as an additional clipping network so that signals having substantially a square wave configuration appear at terminal 50a. A rectifier 51a is connected between terminal 30 and terminal 50a. A rectifier 52a is connected between terminal 50a and terminal 30'. Terminal 50a is also connected to the first input terminal 55a of a second summing circuit.

The apparatus of FIGURE 7 is provided with as many individual clipping circuits as there are signals to be compared. Thus, the summing circuit previously described is provided with additional input termnals 22b, 22c . . . 22n. The clipping circuit associated with terminal 22n is illustrated in the lower part of FIGURE 7. This clipping circuit is identical to the one previously described and corresponding elements are designated by similar n reference charcters.

Input terminals 55a, 55b, 55c . . . 55n are connected through respective resistors 56a, 56b, 56c . . . 56n to the first input of a summing amplifier 57. Amplifier 57 is provided with two feedback resistors 58 and 59 in series, the latter being adjustable. The output of amplifier 57 is connected through a pair of back-to-back rectifiers 60 and a resistor 61 to ground. Output terminals 62 and 63 are connected to the respective end terminals of resistor 61.

As previously mentioned, the signal at terminal 30 comprises a series of negative pulses which represent the negative half cycles of the sum of the signals to be compared. The signal at terminal 30' represents the corresponding positive pulses of this sum. Rectifiers 51a and 51n operate to transmit the output signal from the upper clipping circuit to the first input of summing amplifier 57 when this clipped signal is in phase with the summed output signal from amplifier 24. The operation of rectifiers 51a and 51n in this manner can readily be seen from an examination of the curves in FIGURE 8. It will be assumed that the output signal which appears at terminal 50a from triode 34a is of a square wave configuration as shown by curve 65. It will first be assumed that this signal is in phase with the sum of the individual signals being compared. Under these circumstances, the output signals at terminals 30 and 30' are of the form shown by respective curves 66 and 67 of FIGURE 8. During the first half cycle, terminal 50a is positive and terminal 30 is zero so that rectifier 51a does not conduct. Terminal 30' is positive at this same time so that rectifier 52a does not conduct. Thus, the positive half cycle of the output signal from triode 34a is transmitted as an input to summing amplifier 57. During the second half cycle, the signal at terminal 50a is negative. The signal at terminal 30 is also negative, whereas the signal at terminal 30' is zero. Again, neither of the rectifiers 51a or 52a conducts so that a negative signal is transmitted from triode 34a to summing amplifier 57.

If the signal transmitted through triode 34a should be 180° out of phase with the sum of the initial input signals, as shown by curve 68, there is no output signal transmitted to summing amplifier 57. During the first half cycle of such a signal, terminal 50a is negative. However, the potential at terminal 30 is zero so that rectifier 51a conducts to prevent the signal at terminal 50a from being transmitted to amplifier 57. During the second half cycle, the signal at terminal 50a is positive whereas the signal at terminal 30' is zero, so that rectifier 52a conducts. Thus, the output signal from triode 34a is shorted at all times so that there is no output signal transmitted to summing amplifier 57.

The clipped signals from the remainder of the individual networks are also compared with summed signals at terminals 30 and 30'. The resulting transmitted signals are applied to summing amplifier 57 through respective resistors 56b, 56c . . . 56n. The magnitude of the output signal from amplifier 57 is thus representative of the number of input signals which are in phase with the sum of the input signals. Variable resistor 59 permits the gain of summing amplifier 57 to be adjusted so that an output signal is transmitted only when a preselected number of individual signals are in phase with the sum.

The effectiveness of this procedure for identifying common reflections in a plurality of seismic records is illustrated in FIGURES 9 and 10. The curves of FIGURE 9 are seismic records prior to being processed by the apparatus of this invention. Electrical signals representative of the curves of FIGURE 9 are then applied as inputs to the apparatus of FIGURE 6. The procedure is repeated a number of times with the curves of FIGURE 9 being displaced from one another by amounts varying from +33° to −36°, as noted in FIGURE 10. These displacements are arbitrary assumptions to compensate for "angularity of path" corrections of the seismic signals. The output signals of the apparatus of FIGURE 6 are then applied as inputs to the apparatus of FIGURE 7. As noted in FIGURE 10, there is a decided correlation near the center of the resulting records, with respect to time. This indicates that common reflection appear in the records at this time.

Referring now to FIGURE 11, there is shown a storage means 110 wherein there is disposed a plurality of individual seismic signals which have been corrected for angularities-of-path in time alignment zone 3 (see FIGURE 1) in accordance with the proper dip angle as determined in discrimination zone 4 and selection zone 5. Storage means 110 can comprise a magnetic tape. All of the corrected signals are removed from storage means 110 and applied to a means for summing 112 to thereby form the control trace (FIGURE 13).

The control trace that appears at the output of 112 is next applied to each of two channels in such manner that the control trace is divided into (+) and (−) polarity components. Where reference is made hereinafter to a plus or minus polarity signal that is derived from this seismic data, the reference is to the polarity of the signal as it appears when drawn from the storage means 110, regardless of its actual polarity in subsequent apparatus and operation. This is because the means for summing 112 and other apparatus each causes a phase inversion. Therefore, for clarity, a plus (+) signal or channel (a channel for operating on a plus signal) refers to a signal as it appears in the storage means 110, and similarly for the opposite polarity. The ultimate output signal of the coherence multiplication system is phase inverted from the input signal of the coherence multiplication system. It is not essential to correct this condition, but correction can be achieved by connecting an inverting amplifier to the output terminals. The polarity of the components of the control trace is determined in accordance with an arbitrarily selected zero. The same operations are performed on this control trace in each channel. Therefore, for the sake of brevity, only one channel—that operating on the positive polarity signal—will be described hereinafter. The negative polarity signals are operated on in that portion of the apparatus denoted by prime numbers in FIGURE 11. For the sake of providing uniform channel construction, the signal into the (—) channel is subjected to phase inversion in inverter 155.

The control trace is next applied as one of the input signals to a mixer 114, which is really another means for summing and which also receives a negative-going second input (sawtooth) signal 115 (FIGURE 12) and produces the waveform 116 (FIGURE 14) as an output signal. A sawtooth generator provides the signal 115 which is combined with the control trace in the mixer 114 to thereby produce the waveform 116. A negative-going sawtooth 115 is applied to both the plus and minus polarity channels because (a) mixers 114 and 114' include a phase-inverting amplifier and (b) inverter 115 provides a control trace of correct phase for mixing with the sawtooth in the negative channel.

The waveforms 116 thus produced are next applied to first and second width modulators 117 and 117' wherein there is formed a time-series of pulses 118 (FIGURE 15), the spacings of which are a function of, and may be said to be representative of, the successively occurring amplitudes of the respective polarity component of the control trace. The spikes of the waveform shown in FIGURE 14 are necessary to switch the width modulator 117 from one state to another. The width modulator 117 (also 117') is essentially a flip-flop which is adjusted to change state upon the application to the input terminal thereof of a voltage equal to E (as shown in FIGURE 14) and to subsequently change state after that event only upon the input signal going to zero. Changes in the region from zero to E volts produce no change of state. The switching function upon the application of voltage E occurs whether the voltage is equal or greater than E. The spikes of FIGURE 14 consume a time interval of about 1 percent of the total duration of 1 sawtooth cycle (1000 microseconds). The output signal of the width modulator has the waveform 118 as shown in FIGURE 15. It should be apparent from comparing FIGURE 14 with FIGURE 15 that the width modulator also performs a polarity separating function because no width modulator signals are produced by the negative portion of the control trace (speaking with reference to the negative portion of FIGURE 14) by reason of the inability of the mixed signal to achieve a voltage amplitude equal to or greater than E. It should be understood that the summing circuit 112 and mixer 114 both include an inverting amplifier and therefore the inversion that takes place in the mixer 114 merely returns the control trace component to its original polarity as derived from the original signals drawn from 10.

The sawtooth signal thus serves to "sample" the amplitudes of the control trace. As is evident from FIGURE 14, there is some non-symmetry in the sampling, by reason of the shape of the sawtooth frequency. Hereinafter, when the term "sample" or "sampling" is used, reference is made to the technique of causing a circuit to change state by applying thereto a compound waveform made up of plural waveforms neither one of which is capable of producing a stable change of state by itself.

Each respective series of pulses (waveform 118) is then applied to a power state 120, hereinafter termed a driver. One of the principal reasons for supplying the drivers 120 and 120' is to provide sufficient power so that the wave trains 121 and 121', respectively, formed therein can be applied to a plurality of individual channels, thereby to be compared, i.e., multiplied by the individual seismic traces operated on in each individual channel. Moreover, it is to be noted that the output signals 121, 121' from the driver (and width modulator too) have various spacings W, each of which are representative of an amplitude of the control trace produced in the means for summing 112. The reason that two channels are provided for producing these time spaced pulses is so that signals of different polarities can be multiplied by them.

This common equipment of the coherence multiplication system provides a control trace which is compared by multiplication with each individual seismic data trace in an individual subsequent circuit. One of these subsequent circuits is next described. It is understood that a plurality of these individual circuits is provided and that, preferably they are all constructed in like manner.

Still referring to FIGURE 11, a signal representing a lower quality seismic data trace is removed from storage 110 and applied to a means, 122, for separating such trace into its positive and negative polarity components. From this point on there is a separate channel provided for the components of each polarity. These components are next applied to an inverting amplifier and a clamp circuit in combination 124 and 124' (representing each channel respectively). The clamp circuits operate to pass only those signals having a certain amplitude or greater. Such signals as are passed are applied to multiplying circuits 126 and 126' where they are multiplied by the time spaced signals 121 or 121', as the case may be. The output signals from the multipliers are then applied to a fourth means for summing, 128.

The output signal from the means for summing has the general appearance of signal 129. As noted on the drawing, it is of broken line form and the positive and negative components have discontinuities 130 where they come together. In some instances (e.g. where 130 is small) the signal 129 may comprise a usable form of output signal. However, it is generally desired to form a continuous signal having discontinuities 130 removed, if possible. To this end, a filter 132 is provided. The output signal from the filter 132 is of the general form 133 having seismic events 134 clearly shown thereon and segments 135 which represent those areas where noise has been eliminated. Filter 132 can be a band pass RC active filter or a LRC passive filter of a general type well-known to those in the electronic art.

The details of a preferred embodiment of the coherence multiplication system are disclosed in copending application Serial No. 811,367, filed May 6, 1959, by J. P. Greening, now U.S. Patent 3,032,743, the description of which is incorporated herein by reference.

From the foregoing description it can readily be seen that there is provided in accordance with this invention a novel procedure and apparatus for identifying information in a plurality of signals and which are particularly adapted for increasing the value of low signal-to-noise ratio seismic signals. While the invention has been described in conjunction with a presently preferred embodiment, it is obvious that it is not limited thereto.

We claim:

1. An apparatus for correcting the normal moveout of a plurality of seismic traces, produced by a plurality of seismometers, comprising means for generating a mechanical analog of the seismic time triangle for each of said traces, said triangle comprising legs $t_h$, $t_r$, $t_n$, where leg $t_h$ is the horizontal time from shotpoint to seismometer, leg $t_r$ is the time from shot image to seismometer and leg $t_n$ is the normal time from shotpoint to shot image, a plurality of transcribing stations, one element of said analog being a stored record of the respective one of said traces capable of being dynamically transcribed by a respective one of said plurality of transcribing stations, said one element corresponding to said leg $t_r$ of said seismic time triangle, means for manipulating the analogs so that the length of the leg $t_n$ of each of said analogs increases uniformly with time, this time starting from a time corresponding to shot instant when the legs $t_r$ and $t_h$ of said analog are coincident, the length of the leg $t_h$ of each of said analogs is proportional to the shot point to seismometer distance and inversely proportional to the average velocity between shot image and seismometer, the angle between the leg $t_h$ and leg $t_n$ for each of said analogs is 90° plus the angle of dip of the horizon, and so that the length of the leg $t_r$ of each of said analogs is such as to maintain each of said analog triangles closed, said transcribing stations during said manipulating being located on said stored records external to the analog triangles, so that the resulting non-uniform motion of said stored records across said transcribing stations will cause the time of transcription of seismic events to be equivalent to the normal time rather than the reflection time, means for summing the transcribed signals of said transcribing stations, means for comparing the resulting sum with each of said transcribed signals, means for establishing an output signal for each of said transcribed signals that is in phase with said resulting sum, means for summing the output signals to produce a coherence signal, the magnitude of the coherence signal being representative of the common information present in said transcribed signals, means for varying the value of said angle of dip, and means for comparing the coherence signals corresponding to a plurality of values of said angle of dip to determine the proper value of said angle of dip for accurate time alignment of said plurality of seismic traces.

2. Apparauts for increasing the information available from a plurality of low signal-to-noise ratio seismic signals comprising, in combination; a plurality of magnetic tapes; means for storing each of said plurality of low signal-to-noise ratio seismic signals on a respective one of said magnetic tapes; means to produce a plurality of transcribed signals with each of said transcribed signals being responsive to the signal stored on a respective one of said magnetic tapes and to the rate of movement of such respective magnetic tape past said means to produce; means for varying the rate of movement of each of said magnetic tapes past said means to produce as a function of time, a predetermined dip angle, and the ratio of the distance between the shotpoint and the seismometer station at which the respective seismic signal was detected to the average velocity of the seismic wave, whereby said transcribed signals are representative of said plurality of low signal-to-noise ratio seismic signals in a time-aligned relationship for said predetermined dip angle; first and second summing means; means for applying to said first summing means as inputs thereto said plurality of transcribed signals from said means to produce; a plurality of signal comparing means, each having a first input and a second input and an output and each of which is adapted to transmit a signal when input signals thereto are in phase; means connecting the output of said first summing means to each of the first inputs of said plurality of signal comparing means; means connecting each of said plurality of transcribed signals from said means to produce to a respective one of the second inputs of said plurality of signal comparing means; means connecting the outputs of said comparing means to the inputs of said second summing means, and means for varying the value of said predetermined dip angle, whereby a comparison of the outputs of said second summing means corresponding to each value of said predetermined dip angle is indicative of the proper value of dip angle to be utilized for accurate time alignment of said plurality of low signal-to-noise ratio seismic signals.

3. Apparatus for increasing the information available from a plurality of low signal-to-noise ratio seismic signals comprising, in combination; a plurality of magnetic tapes; means for storing each of said plurality of low signal-to-noise ratio seismic signals on a respective one of said magnetic tapes; means to produce a plurality of transcribed signals with each of said transcribed signals being responsive to the signal stored on a respective one of said magnetic tapes and the rate of movement of such respective magnetic tape past said means to produce; means for varying the rate of movement of each of said magnetic tapes past said means to produce as a function of time, a predetermined dip angle, and the ratio of the distance between the shotpoint and the seismometer station at which the respective seismic signal was detected to the average velocity of the seismic wave, whereby said transcribed signals are representative of said plurality of low signal-to-noise ratio seismic signals in a time-aligned relationship for said predetermined dip angle; first and second summing means; means for applying to said first summing means as inputs thereto said plurality of transcribed signals from said means to produce; a plurality of signal comparing means, each having a first input and a second input and an output and each of which is adapted to transmit a signal when input signals thereto are in phase; means connecting the output of said first summing means to each of the first inputs of said plurality of signal comparing means; means connecting each of said plurality of transcribed signals from said means to produce to a respective one of the second inputs of said plurality of signal comparing means; means connecting the outputs of said comparing means to the inputs of said second summing means, means for varying the value of said predetermined dip angle, whereby a comparison of the outputs of said second summing means corresponding to each value of said predetermined dip angle is indicative of the proper value of dip angle to be utilized for accurate time alignment of said plurality of low signal-to-noise ratio seismic signals; a third summing means to sum a plurality of seismic signals to establish a first signal; means to apply to said third summing means as inputs thereto the transcribed signals from said means to produce which were provided as a function of said proper value of dip angle; fourth and fifth summing means; a sawtooth generator; means connecting the output of said generator to an input of said fourth summing means; means connecting the output of said third summing means to an input of said fourth summing means; a signal inverter; means connecting the output of said third summing means to an input of said fifth summing means through said signal inverter; means connecting the output of said generator to an input of said fifth summing means; first and second pulse width modulators; means connecting the outputs of said fourth and fifth summing means to the inputs of said first and second modulators, respectively; first and second signal multiplying means; means to divide a seismic signal into positive and negative components; means connecting the positive components output of said means to divide and the output of said first modulator to the respective inputs of said first multiplying means; means connecting the negative components output of said means to divide and the output of said second modulator to the respective inputs of said second multiplying means; and means to sum the outputs of said first and second multiplying means.

4. Apparatus for increasing the information available from a plurality of low signal-to-noise ratio seismic signals comprising, in combination; a plurality of magnetic tapes; means for storing each of said plurality of low signal-to-noise ratio seismic signals on a respective one of said magnetic tapes; means to produce a plurality of transcribed signals, with each of said transcribed signals being responsive to the signal stored on a respective one of said magnetic tapes and the rate of movement of such respective magnetic tape past said means to produce; means for varying the rate of movement of each of said magnetic tapes past said means to produce as a function of time, a predetermined dip angle, and the ratio of the distance between the shotpoint and the seismometer station at which the respective seismic signal was detected to the average velocity of the seismic wave, whereby said transcribed signals are representative of said plurality of low signal-to-noise ratio seismic signals in a time-aligned relationship for said predetermined dip angle; first and second summing means; means for applying to said first summing means as inputs thereto said plurality of transcribed signals from said means to produce; a plurality of signal comparing means, each having a first input and a second input and an output and each of which is adapted to transmit a signal when input signals thereto are in phase; means connecting the output of said first summing means to each of the first inputs of said plurality of signal comparing means; means connecting each of said plurality of transcribed signals from said means to produce to a respective one of the second inputs of said plurality of signal comparing means; means connecting the outputs of said comparing means to the inputs of said second summing means; means for varying the value of said predetermined dip angle whereby a comparison of the outputs of said second summing means corresponding to each value of said predetermined dip angle is indicative of the proper value of dip angle to be utilized for accurate time alignment of said plurality of low signal-to-noise ratio seismic signals; means for summing the transcribed signals from said means to produce corresponding to said proper value of said dip angle to form a first signal; means for generating a sawtooth signal; means for summing said first signal and said sawtooth signal to form a second signal; means for summing said sawtooth signal and the inverse of said first signal to form a third signal; means for generating a pulse of uniform amplitude when said second signal exceeds a first predetermined value to form a fourth signal; means for generating a pulse of uniform amplitude when said third signal exceeds a second predetermined value to form a fifth signal; means for dividing an individual one of said transcribed signals from said means to produce corresponding to said proper value of said dip angle into positive and negative components, means for multiplying said fourth signal by said positive components to form a sixth signal, means for multiplying said fifth signal by said negative components to form a seventh signal, and means for summing said sixth and seventh signals.

5. Apparatus for increasing the information available from a plurality of low signal-to-noise ratio seismic traces comprising, in combination, means for generating a mechanical analog of the seismic time triangle for each of said traces, said triangle comprising legs $t_h$, $t_r$, and $t_n$, where leg $t_h$ is the horizontal time from shotpoint to seismometer, leg $t_r$ is the time from shot image to seismometer, and leg $t_n$ is the normal time from shotpoint to shot image, a plurality of transcribing stations, one element of said analog being a stored record of the respective one of said traces capable of being dynamically transcribed by a respective one of said plurality of transcribing stations, said one element corresponding to said leg $t_r$ of said seismic time triangle; means for manipulating the analogs so that the length of the leg $t_n$ of each of said analogs increases uniformly with time, this time starting from a time corresponding to shot instant when the legs $t_r$ and $t_h$ of said analog are coincident, the length of the leg $t_h$ of each of said analogs is proportional to the shotpoint to seismometer distance and inversely proportional to the average velocity between shot image and seismometer, the angle between the leg $t_h$ and leg $t_n$ for each of said analogs is 90° plus the angle of dip of the horizon, and so that the length of the leg $t_r$ of each of said analogs is such as to maintain each of said analog triangles closed; said transcribing stations during said manipulating being located on said stored records external to the analog triangles, so that the resulting non-uniform motion of said stored records across said transcribing stations will cause the time of transcription of seismic events to be equivalent to the normal time rather than the reflection time; first summing means for summing the transcribed signals of said transcribing stations; means for comparing the resulting sum with each of said transcribed signals; means for establishing an output signal for each of said transcribed signals that is in phase with said resulting sum; second summing means for summing the output signals to produce a coherence signal, the magnitude of the coherence signal being representative of the common information present in said transcribed signals; means for varying the value of said angle of dip; and means for comparing the coherence signals corresponding to a plurality of values of said angle of dip to determine the proper value of said angle of dip for accurate time alignment of said plurality of seismic traces; means for summing the transcribed signals from said means to produce corresponding to said proper value of said angle of dip to form a first signal; means for generating a sawtooth signal; means for summing said first signal and said sawtooth signal to form a second signal; means for summing said sawtooth signal and the inverse of said first signal to form a third signal; means for generating a pulse of uniform amplitude when said second signal exceeds a first predetermined value to form a fourth signal; means for generating a pulse of uniform amplitude when said third signal exceeds a second predetermined value to form a fifth signal; means for dividing an individual one of said transcribed signals from said means to produce corresponding to said proper value of said angle of dip into positive and negative components; means for multiplying said fourth signal by said positive components to form a sixth signal; means for multiplying said fifth signal by said negative components to form a seventh signal; and means for summing said sixth and seventh signals.

6. Apparatus for increasing the information available from a plurality of low signal-to-noise ratio seismic traces comprising, in combination, means for generating a mechanical analog of the seismic time triangle for each of said traces, said triangle comprising legs $t_h$, $t_r$, and $t_n$, where leg $t_h$ is the horizontal time from shotpoint to seismometer, leg $t_r$ is the time from shot image to seismometer, and leg $t_n$ is the normal time from shotpoint to shot image, a plurality of transcribing stations, one element of said analog being a stored record of the respective one of the said traces capable of being dynamically transcribed by a respective one of said plurality of transcribing stations, said one element corresponding to said leg $t_r$ of said seismic time triangle; means for manipulating the analogs so that the length of the leg $t_n$ of each of said analogs increases uniformly with time, this time starting from a time corresponding to shot instant when the legs $t_r$ and $t_h$ of said analog are coincident, the length of the leg $t_h$ of each of said analogs is proportional to the shotpoint to seismometer distance and inversely proportional to the average velocity between shot image and seismometer, the angle between the leg $t_h$ and leg $t_n$ for each of said analogs is 90° plus the angle of dip of the horizon, and so that the length of the leg $t_r$ of each of said analogs is such as to maintain each of said analog triangles closed; said transcribing stations during said manipulating being located on said stored records external to the analog triangles, so that the resulting non-uniform motion of said stored records across said transcribing stations will cause the time of transcription of seismic events to be equivalent to the normal time rather than the reflection time; first summing means for summing the transcribed signals of said transcribing stations; means for comparing the resulting sum with each of said transcribed signals; means for establishing an output signal for each of said transcribed signals that is in phase with said resulting sum; second summing means for summing the output signals to produce a coherence signal, the magnitude of the coherence signal being representative of the common information present in said transcribed signals; means for varying the value of said angle of dip;

and means for comparing the coherence signals corresponding to a plurality of values of said angle of dip to determine the proper value of said angle of dip for accurate time alignment of said plurality of seismic traces; third summing means to sum a plurality of seismic signals to establish a first signal; means to apply to said third summing means as inputs thereto the transcribed signals from said means to produce which were produced as a function of said proper value of dip angle; fourth and fifth summing means; a sawtooth generator; means connecting the output of said third summing means and the output of said generator to the inputs of said fourth summing means; a signal inverter; means connecting the output of said third summing means to an input of said fifth summing means through said signal inverter; means connecting the output of said generator to an input of said fifth summing means; first and second pulse width modulators; means connecting the outputs of said fourth and fifth summing means to the inputs of said first and second modulators, respectively; first and second signal multiplying means; means to divide a seismic signal into positive and negative components; means connecting the positive components output of said means to divide and the output of said first modulator to the respective inputs of said first multiplying means, means connecting the negative components output of said means to divide and the output of said second modulator to the respective inputs of said second multiplying means; and means to sum the outputs of said first and second multiplying means.

7. A method for correcting the normal moveout of a plurality of seismic traces, produced by a plurality of seismometers, comprising generating a mechanical analog of the seismic time triangle for each of said traces, said triangle comprising legs $t_h$, $t_r$, and $t_n$, where leg $t_h$ is the horizontal time from shotpoint to seismometer, leg $t_r$ is the time from shot image to seismometer, and leg $t_n$ is the normal time from shot point to shot image, one element of said analog being a stored record of the respective one of said traces capable of being dynamically transcribed by a respective one of a plurality of transcribing stations, said one element corresponding to said leg $t_r$ of said seismic time triangle; manipulating said analogs so that the length of the leg $t_n$ of each of said analogs increases uniformly with time, this time starting from a time corresponding to shot instant when the legs $t_r$ and $t_h$ of said analog are coincident, the length of the leg $t_h$ of each of said analogs is proportional to the shotpoint to seismometer distance and inversely proportional to the average velocity between shot image and seismometer, the angle between the leg $t_h$ and leg $t_n$ for each of said analogs is 90° plus the angle of dip of the horizon, and so that the length of the leg $t_r$ of each of said analogs is such as to maintain each of said analog triangles closed; locating said transcribing stations on said stored records external to the analog triangles during said manipulating so that the resulting non-uniform motion of said stored records across said transcribing stations will cause the time of transcription of seismic events to be equivalent to the normal time rather than the reflection time, summing the transcribed signals of said transcribing stations, comparing the resulting sum with each of said transcribed signals, establishing an output signal for each of said transcribed signals that is in phase with said resulting sum, summing the output signals to produce a coherence signal, the magnitude of the coherence signal being representative of the common information present in said transcribed signals, repeating the above procedure for a plurality of values of said angle of dip, and comparing the coherence signals corresponding to said plurality of values of said angle of dip to determine the proper value of said angle of dip for accurate time alignment of said plurality of seismic traces.

8. A method for increasing the information available from a plurality of low signal-to-noise ratio seismic signals comprising, in combination; storing each of said plurality of low signal-to-noise ratio seismic signals on a respective one of a plurality of magnetic tapes; passing said magnetic tapes through a transcription zone to produce a plurality of transcribed signals with each of said transcribed signals being responsive to the signal stored on a respective one of said magnetic tapes and to the rate of movement of such respective one of said magnetic tapes through said transcription zone; varying the rate of movement of each of said magnetic tapes through said transcription zone as a function of time, a predetermined dip angle and the ratio of the distance between the shotpoint and the seismometer station at which the respective seismic signal was detected to the average velocity of the seismic wave; summing said plurality of transcribed signals from said transition zone; comparing each of said plurality of transcribed signals with the sum of said plurality of transcribed signals and producing an output signal corresponding to each of said plurality of transcribed signals when the respective transcribed signal is in phase with the sum of said plurality of transcribed signals; summing the output signals to produce a coherence signal, the magnitude of the coherence signal being representative of the common information present in said transcribed signals; repeating the above procedure for a plurality of values of said predetermined dip angle, and comparing the coherence signals corresponding to said plurality of values of said predetermined dip angle to determine the proper value of said dip angle for accurate time alignment of said plurality of low signal-to-noise ratio seismic signals.

9. Method for increasing the information available from a plurality of low signal-to-noise ratio seismic signals comprising, in combination; storing each of said plurality of low signal-to-noise ratio seismic signals on a respective one of a plurality of magnetic tapes; passing said magnetic tapes through a transcription zone to produce a plurality of transcribed signals with each of said transcribed signals being responsive to the signal stored on a respective one of said magnetic tapes and to the rate of movement of such respective magnetic tape through said transcription zone; varying the rate of movement of each of said magnetic tapes through said transcription zone as a function of time, a predetermined dip angle, and the ratio of the distance between the shotpoint and the seismometer station at which the respective seismic signal was detected to the average velocity of the seismic wave; summing the plurality of transcribed signals from said transcription zone; comparing each of said plurality of transcribed signals with the sum of said plurality of transcribed signals and producing an output signal corresponding to each of said plurality of transcribed signals when the respective transcribed signal is in phase with the sum of said plurality of transcribed signals; summing the output signals to produce a coherence signal, the magnitude of the coherence signal being repesentative of the common information present in said transcribed signals; repeating the above procedure for a plurality of values of said predetermined dip angle; comparing the coherence signals corresponding to said plurality of values of said predetermined dip angle to determine the proper value of said dip angle for accurate time alignment of said plurality of low signal-to-noise ratio seismic signals; summing the transcribed signals from said transcription zone corresponding to said proper value of said dip angle to form a first signal; generating a sawtooth signal; summing the said first signal and said sawtooth signal to form a second signal; summing said sawtooth signal and the inverse of said first signal to form a third signal; generating a pulse of uniform amplitude when said second signal exceeds a first predetermined value to form a fourth signal; generating a pulse of uniform amplitude when said third signal exceeds a second predetermined value to form a fifth signal; dividing an individual one of said transcribed signals from said transcription zone corresponding to said proper value of said dip angle into positive and negative components; multiplying said fourth signal by said positive components to form a sixth signal; multiplying said fifth signal by said negative components to form a seventh signal; and summing said sixth and seventh signals.

10. A process for effecting the proper time alignment of a plurality of seismic signals comprising aligning said plurality of seismic signals for a plurality of values of dip angle, summing the aligned signals corresponding to each of said values of dip angle to form composite signals, comparing the individual aligned signals corresponding to each of said values of dip angle with the respective composite signal and producing an output signal whenever an individual aligned signal is in phase with the respective composite signal, summing the output signals corresponding to each of said values of dip angle to form correlation signals, and comparing said correlation signals to thereby determine the proper value of dip angle.

11. A process for improving the reflection seismology technique by increasing the readability of a plurality of low signal-to-noise seismic signals comprising aligning said plurality of seismic signals for a plurality of values of dip angle, summing the aligned signals corresponding to each of said values of dip angle to form composite signals, comparing the individual aligned signals corresponding to each of said values of dip angle with the respective composite signal and producing an output signal whenever an individual aligned signal is in phase with the respective composite signal, summing the output signals corresponding to each of said values of dip angle to form correlation signals, comparing said correlation signals to thereby determine the proper value of dip angle, summing the aligned signals corresponding to said proper value of dip angle to obtain a first signal, and multiplying each of said aligned signals corresponding to said proper value of dip angle by said first signal when said each of said aligned signals corresponding to said proper value of dip angle is of the same polarity of said first signal.

12. A method for correcting the normal moveout of a plurality of seismic traces produced by a plurality of seismometers, comprising generating mechanical analog of the seismic time triangle for each of said traces, said triangle comprisings legs $t_h$, $t_r$, and $t_n$, where leg $t_h$ is the horizontal time from shot point to seismometer, leg $t_r$ is the time from shot image to seismometer, and leg $t_n$ is the normal time from shotpoint to shot image, one element of said analog being a magnetic tape of one of said seismic traces capable of being dynamically transcribed by a respective one of a plurality of transcribing stations located on said magnetic tape external to the analog triangle, said one element corresponding to said leg $t_r$ of said seismic time triangle, and manipulating said analogs by affixing the initial time ends of said magnetic tapes to a constant speed transporting means so that the length of the $t_n$ of each of said analogs increases uniformly with time, this time starting from a time corresponding to shot instant when the legs $t_r$ and $t_h$ of said analog are coincident, there is generated a plurality of dimensions proportional to each shotpoint to seismometer distance and inversely proportional to said average velocity and said dimensions are applied as the leg $t_h$ of each of said corresponding analogs, the angle between the leg $t_h$ and leg $t_n$ for each of said analogs is 90° plus the angle of dip of the horizon, so that the length of the leg $t_r$ of each of said analogs is such as to maintain each of said analog triangles closed, and so that the resulting non-uniform motion of said magnetic tapes across said transcribing stations will cause the time of transcription of seismic events to be equivalent to the normal time rather than the reflection time, summing the transcribed signals from said transcribing stations, comparing the resulting sum with each of said transcribed signals, establishing an output signal for each of said transcribed signals that is in phase with said resulting sum, summing the output signals, the magnitude of the sum of said output signals being representative of the common information present in said transcribed signals, repeating the above procedure for a plurality of values of said angle of dip, and comparing the sums of the output signals corresponding to each of said values of said angle of dip to determine the proper value of said angle of dip.

References Cited by the Examiner
UNITED STATES PATENTS

| | | | |
|---|---|---|---|
| 2,732,025 | 1/56 | Lee | 181—0.5 |
| 2,898,574 | 8/59 | Palmer | 340—15.5 |
| 3,032,743 | 5/62 | Greening | 340—15.5 |

SAMUEL FEINBERG, *Primary Examiner.*

CHESTER L. JUSTUS, BENJAMIN A. BORCHELT, *Examiners.*